United States Patent
Bansal

(10) Patent No.: US 9,510,317 B1
(45) Date of Patent: Nov. 29, 2016

(54) LOCATION ESTIMATION OF MOBILE STATIONS BY COORDINATING THE ACQUISITION AND USE OF CONTROL PLANE AND USER PLANE LOCATION DATA

(71) Applicant: Polaris Wireless, Inc., Mountain View, CA (US)

(72) Inventor: Ankit Bansal, Uttar Pradesh (IN)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 14/857,021

(22) Filed: Sep. 17, 2015

(51) Int. Cl.
| | |
|---|---|
| H04W 64/00 | (2009.01) |
| H04W 24/02 | (2009.01) |
| H04W 4/02 | (2009.01) |
| H04W 88/02 | (2009.01) |
| H04W 88/12 | (2009.01) |

(52) U.S. Cl.
CPC ............ H04W 64/003 (2013.01); H04W 4/02 (2013.01); H04W 24/02 (2013.01); *H04W 4/023* (2013.01); *H04W 88/02* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 2007/0298793 A1* | 12/2007 | Dawson | H04W 76/022 455/435.1 |
| 2012/0142313 A1* | 6/2012 | Edge | H04W 64/003 455/410 |

* cited by examiner

*Primary Examiner* — Charles Appiah
*Assistant Examiner* — Margaret G Mastrodonato
(74) *Attorney, Agent, or Firm* — Kaplan Breyer Schwarz & Ottesen, LLP

(57) ABSTRACT

A technique for estimating the geo-location of a mobile station, based on signal measurements or other data that are obtained from both the control plane and the user plane. Through the coordination of obtaining signal measurements from both planes, the disclosed method and system make location estimations of greater accuracy possible. A data-processing system is configured to receive requests for location estimates from a location-based services (LBS) client or from a different source. The illustrative data-processing system then coordinates the acquisition of location data across both the control plane and the user plane, and correlates the data. The correlated location data can be subsequently used to generate a location estimate.

11 Claims, 6 Drawing Sheets

LOCATION ESTIMATION OF MOBILE STATIONS BY COORDINATING THE ACQUISITION AND USE OF CONTROL PLANE AND USER PLANE LOCATION DATA

FIELD OF THE INVENTION

The present invention relates to wireless networks in general, and, more particularly, to locating mobile stations by using control plane and user plane location data.

BACKGROUND OF THE INVENTION

FIG. 1 depicts a schematic diagram of a portion of wireless telecommunications network 100 that is available in the prior art. Wireless network 100 comprises: mobile switching center ("MSC") 101, base station controller ("BSC") 103, base station 105, serving mobile location center ("SMLC") 107, gateway mobile location center ("GMLC") 109, secure user plane location (SUPL) location platform ("SLP") 111, location-based services ("LBS") client 113, and mobile station 150, interrelated as shown. At least some of the aforementioned elements communicate with each other via computer network 130.

Wireless network 100 as illustrated in FIG. 1 is a wireless network that is configured to operate according to the Global System for Mobile Communications ("GSM") standards. In some configurations, wireless network 100 can be a wireless network that is based on a different 3rd Generation Partnership Project ("3GPP") cellular network standard, such as Universal Mobile Telecommunications System ("UMTS") or Long-Term Evolution ("LTE"), or based on a 3rd Generation Partnership Project 2 ("3GPP") cellular network standard, such as Code Division Multiple Access ("CDMA").

Mobile switching center ("MSC") 101 is a wireless network element that, among other functions, provides mobility management and primary call support, for voice and other services, along with connectivity to the Public Switched Telephone Network ("PSTN").

Base station controller ("BSC") 103 is responsible for signaling between a mobile station and the main switching elements of the network such as mobile switching center 101. Typically, base station controller 103 controls a plurality of base stations 105, but only one base station 105 is illustrated here for simplicity.

Base station 105 is responsible for the wireless radio frequency ("RF") communication link to the mobile stations in the area. Base station 105 serves a cell of wireless network 100 and has a unique cell identification within the network. A group of cells define a "location area." As illustrated in FIG. 1, base station 105 is the serving base station to mobile station 150, i.e., provides the necessary service that enables voice and/or data services to mobile station 150.

Serving mobile location center ("SMLC") 107 provides standards-based, control plane (CP) locating, by i) collecting information from mobile station 150 and/or serving base station 105 via base station controller 103 and ii) based on the information collected, estimating the mobile's location to a certain level of accuracy (e.g., to within a radius of 300 meters). The SMLC performs location estimation via one or more methods that can include cell-ID (CID), cell ID plus timing information (CI+TI), enhanced cell ID (E-CID), observed time difference of arrival (OTDOA), assisted Global Positioning System (A-GPS), or radio-frequency pattern-matching (RFPM), for example and without limitation. In providing a location estimate via a control plane location procedure, these methods utilize signal measurements and/or other data (e.g., handset-calculated location, etc.) that are obtained via the control plane and from the mobile station and/or serving base station.

Gateway mobile location center ("GMLC") 109 is an element of the wireless network that typically interfaces with external location services systems that provide higher-level applications. Within wireless network 100, gateway mobile location center 109 transmits location requests to mobile switching center 101 and receives location estimates that were generated by serving mobile location center 107 and transmitted therefrom "upstream" to gateway mobile location center 109.

SUPL location platform ("SLP") 111 provides functionality similar to that of SMLC 107, except through the user plane (UP). The location estimation performed by SLP 111 utilizes signal measurements and/or other data (e.g., handset-calculated location, etc.) that are obtained via the user plane from mobile station 150.

Location-based services ("LBS") client 113 requests and uses location data to control features, such as deploying emergency resources in response to E-911 calls and delivering marketing information to customers in a specific geographical area, for example and without limitation.

Mobile station 150 is illustratively a GSM cellular telephone. As such, mobile station 150 wirelessly receives and/or transmits signals from one or more base stations 105. At least some of the signals that are exchanged between mobile station 150 and base station 105 are used in location estimates that involve the control plane or in location estimates that involve the user plane.

SUMMARY OF THE INVENTION

The problem with performing location estimation in at least some prior-art wireless networks is that control plane (CP) location procedures and user plane (UP) location procedures are segregated. In other words, a location-based services client may request a location estimate that is either based on a CP location procedure or based on a UP location procedure. To the extent that both a control-plane location estimate and a user-plane location estimate are available for a given mobile station, they are often based on data that are obtained at different times; in any event, the data has been separately developed into the location estimates. Depending on the circumstances, this can limit the accuracy of a location estimate of a mobile station.

The present invention enables a technique for estimating the geo-location of a mobile station, based on signal measurements that are obtained from both the control plane and the user plane. Through the careful coordination of obtaining signal measurements from both planes, the method and system of the illustrative embodiment of the present invention advantageously make location estimations of greater accuracy possible, compared to at least some methods and systems of the prior art.

In accordance with the illustrative embodiment of the present invention, a coordinating data-processing system is configured to receive requests for location estimates from a location-based services (LBS) client or, alternatively, from a different source. The illustrative data-processing system then coordinates the acquisition of location data across both the control plane and the user plane. Through a clever usage of numeric values within pre-existing messages and bit-fields within those messages, the system of the illustrative embodiment obtains and correlates the data across the two planes and stores the correlated data into databases. The system identifies each set of correlated data as such by tagging the data with an identification. The stored, correlated data can be subsequently used to generate a location estimate. Such a location estimate is associated with greater accuracy, at least when compared to some control-plane-only estimates, some user-plane-only estimates, or some estimates generated from uncorrelated data, in the prior art.

The coordination of location data as disclosed herein is in contrast to at least some prior-art techniques in which either a gateway mobile location center (GMLC) receives the location requests directly or a secure user plane location platform (SLP) receives the location requests directly, and in which those prior-art techniques result in location estimates that do not reflect a coordinated usage of both control plane and user plane location data that are correlated with each other.

An illustrative location estimation system comprises: a first server computer that is configured to: i) receive a location request from a location-based services client, wherein the location request specifies a particular mobile station, ii) transmit, in response to receiving the location request, a first message comprising a first-message bit-field and a second message comprising a second-message bit-field, and iii) transmit a location estimate to the location-based services client, wherein the location estimate is based on both i) a first non-empty set of location data that is obtained through a control plane and ii) a second non-empty set of location data that is obtained through a user plane; a second server computer that is configured to: i) receive the first message, and ii) acquire, through the control plane, the first set of location data in response to receiving the first message and dependent on the value represented in the first-message bit-field; and a third server computer that is configured to: i) receive the second message, and ii) acquire, through the user plane, the second set of location data in response to receiving the second message and dependent on the value represented in the second-message bit-field.

An illustrative method of location estimation comprises: receiving, by a first server computer, a location request from a location-based services client, wherein the location request specifies a particular mobile station; transmitting, by the first server computer and in response to receiving the location request, i) a first message comprising a first-message bit-field to a control plane server and ii) a second message comprising a second-message bit-field to a user plane server; acquiring, by the control plane server and through a control plane, a first set of location data based on the first message and dependent on the value represented in the first-message bit-field; acquiring, by the user plane server and through a user plane, a second set of location data based on the second message and dependent on the value represented in the second-message bit-field; and transmitting, by the first server computer, a location estimate to the location-based services client, wherein the location estimate is based on both i) the first non-empty set of location data that is obtained through the control plane and ii) the second non-empty set of location data that is obtained through the user plane.

Another illustrative method of location estimation comprises: receiving, by a first server computer, a location request from a location-based services client, wherein the location request specifies a particular mobile station, wherein the location-based services client is identified by an identification (ID) present in the location request; transmitting, by the first server computer and in response to receiving the location request, at least one of i) a first message comprising a first-message bit-field to a control plane server and ii) a second message comprising a second-message bit-field to a user plane server, wherein whether each of the first message and second message is transmitted is based on the ID of the location-based services client; acquiring at least one of i) a first set of location data based on the first message and dependent on the value represented in the first-message bit-field and ii) a second set of location data based on the second message and dependent on the value represented in the second-message bit-field; and transmitting, by the first server computer, a location estimate to the location-based services client, wherein the location estimate is based on at least one of i) the first non-empty set of location data that is obtained via the control plane server and ii) the second non-empty set of location data that is obtained via the user plane server.

DETAILED DESCRIPTION

The following documents are incorporated by reference herein:
"Mobile Location Protocol", Version 3.2, Open Mobile Alliance
3GPP TS 29.003, "Mobile Application Protocol"
3GPP TS 43.059 Release 6, "Functional Stage 2 Descriptions of Location Services in GERAN"
3GPP TS 49.031 Release 6, "Location Services (LCS); Base Station System Application Part LCS Extension (BSSAP-LE)"
3GPP TS 48.071 Release 6, "Serving Mobile Location Center-Base Station System (SMLC-BSS) interface; Layer 3 specification (BSSLAP)"
3GPP TS 44.031 Release 6, "LCS; Mobile Station (MS)-SMLC Radio Resource LCS Protocol (RRLP)"
3GPP TS 25.305 Release 7, "Stage 2 functional specification of UE positioning in UTRAN"
3GPP TS 25.453 Release 7, "UTRAN Iupc interface Positioning Calculation Application Part (PCAP) signaling"
3GPP TS 36.305 Release 10, "Stage 2 functional specification of User Equipment (UE) positioning in E-UTRAN"
3GPP TS 29.171 Release 10, "LCS Application Protocol (LCS-AP) between the Mobile Management Entity (MME) and Evolved Serving Mobile Location Center (E-SMLC); SLs interface"
3GPP TS 36.455 Release 10, "LTE Positioning Protocol A (LPPa)"
3GPP TS 36.355 Release 10, "LTE Positioning Protocol (LPP)"

3GPP TS 23.032, "Universal Geographical Area Description"

For the purposes of this specification, the following terms and their inflected forms are defined as follows:

The term "location" is defined as a zero-dimensional point, a finite one-dimensional path segment, a finite two-dimensional surface area, or a finite three-dimensional volume. Thus, a location can be defined, for example, by geographic coordinates or by a perimeter.

The term "mobile station" is defined as a device that is capable of telecommunications without a wire or tangible medium. A wireless terminal can be mobile or immobile. A wireless terminal can transmit or receive, or transmit and receive. As is well known to those skilled in the art, a wireless terminal is also commonly called a cell phone, a pager, a wireless transmit/receive unit (WTRU), a user equipment (UE), a wireless terminal, a fixed or mobile subscriber unit, a pager, a cellular telephone (i.e., "cellphone"), a personal digital assistant (PDA), a computer, and any other type of device capable of operating in a wireless environment (e.g., one that is defined by 3GPP- or 3GPP2-based protocols, etc.) are examples of wireless terminals.

The term "control plane" is defined as the part of a data communications network that carries signaling traffic.

The term "user plane" is defined as the part of a data communications network that carries user-level data.

The term "server" is defined as at least one of i) a running instance of some software capable of accepting requests from clients and ii) the computer device that such a server runs on (i.e., "server computer").

Figure 1:
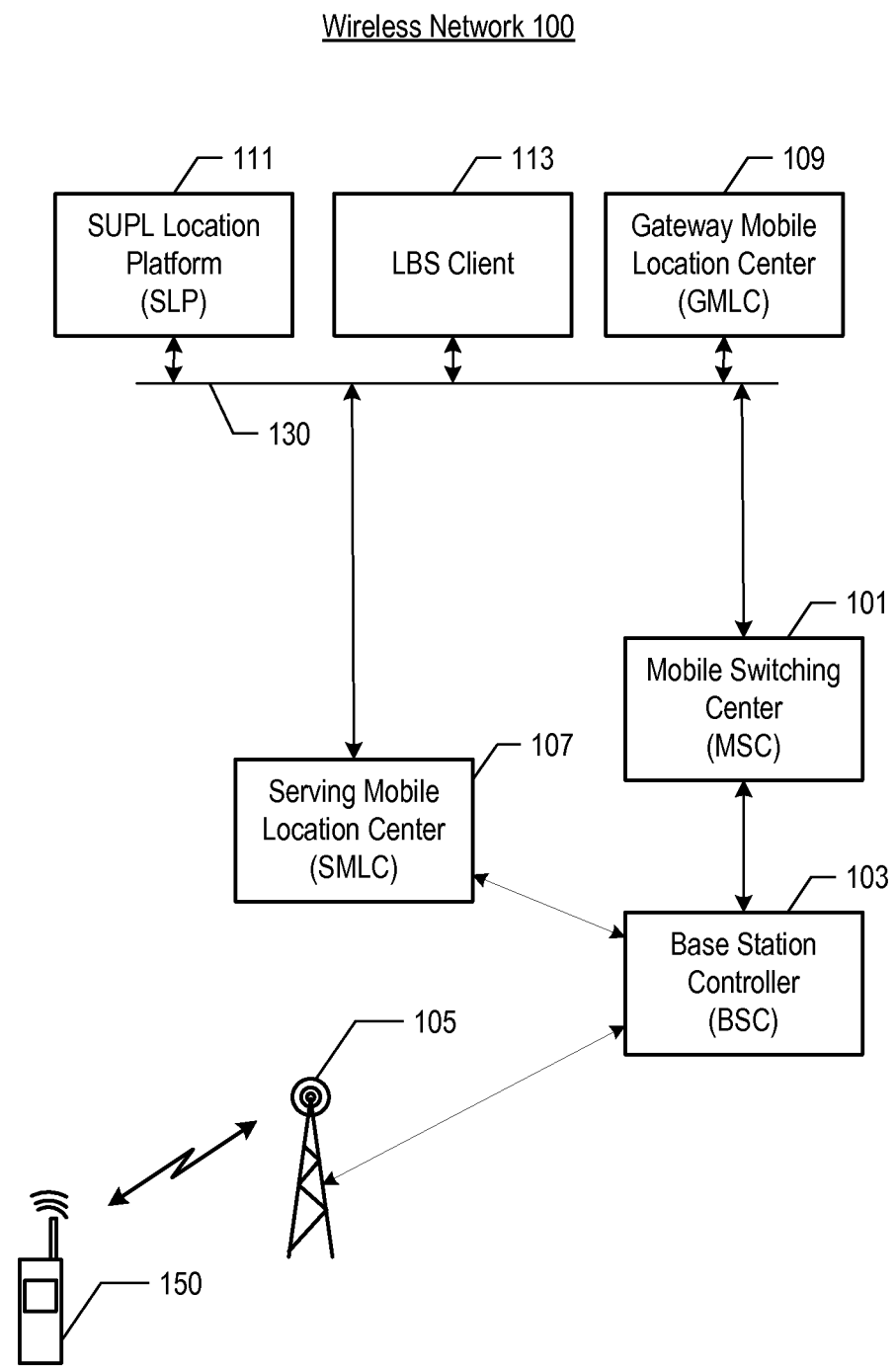
FIG. 1 depicts a schematic diagram of a portion of wireless telecommunications network 100 that is available in the prior art.
Figure 2:
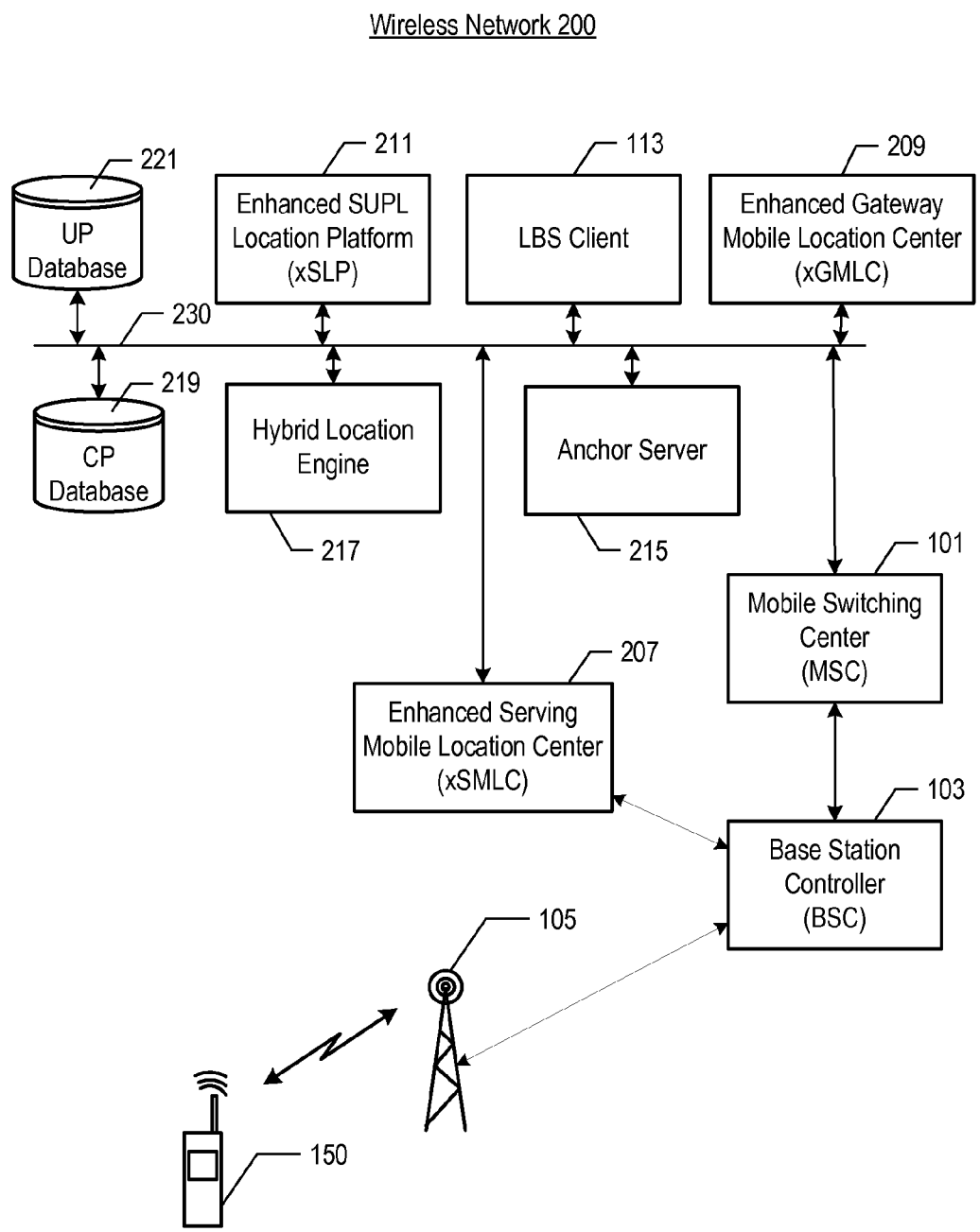
FIG. 2 depicts a schematic diagram of the salient portions of wireless telecommunications network 200 in accordance with the illustrative embodiment of the present invention.

FIG. 2 depicts a schematic diagram of the salient portions of wireless telecommunications network 200 in accordance with the illustrative embodiment of the present invention. Wireless telecommunications network 200 comprises: mobile switching center ("MSC") 101, base station controller ("BSC") 103, base station 105, enhanced serving mobile location center ("xSMLC") 207, enhanced gateway mobile location center ("xGMLC") 209, enhanced secure user plane location (SUPL) location platform ("xSLP") 211, location-based services ("LBS") client 113, hybrid UP CP anchor server 215, hybrid location engine 217, user plane (UP) database 221, control plane (CP) database 219, and mobile station 150, interrelated as shown. For pedagogical purposes, the aforementioned elements refer to hardware devices that, as data-processing systems, execute corresponding functions that are described herein. In some embodiments of the present invention, however, at least some of the aforementioned elements can refer to the functions themselves, as those who are skilled in the art will appreciate after reading this specification.

Wireless network 200 uses the GSM protocol, but it will be clear to those skilled in the art, after reading the present disclosure, how to make and use alternative embodiments of the present invention that use another protocol (e.g., CDMA, TDMA, UMTS, LTE, another 3GPP protocol, another 3GPP2 protocol, etc.). In other words, the systems and methods disclosed herein are agnostic of the particular underlying radio transmission architecture employed in the wireless network, as will be clear after reading the present disclosure.

The illustrative embodiment is described using GSM-specific terminology, but it will be clear to those skilled in the art what the appropriate terms are for non-GSM networks.

Mobile switching center 101, base station controller 103, base station 105, location-based services (LBS) client 113, and wireless telecommunications terminal 150 are well known in the prior art and are described above. For simplicity, distinctions between a serving mobile switching center and other mobile network entities are kept to a minimum herein as such distinctions are well known in the art.

In some embodiments of the present invention, wireless network 200 has packet data capability, in addition to the service capabilities provided by the MSC. A general packet radio service ("GPRS") support node ("GPRS support node"), as is well known in the art, is analogous in some functions to mobile switching center 101, but differs from mobile switching center 101 in that it supports packet data services to the mobile stations. GPRS support nodes are well known in the art.

Enhanced serving mobile location center ("xSMLC") 207 provides standards-based, control plane (CP) locating, by i) collecting information from mobile station 150 and/or serving base station 105 via base station controller 103 and ii) based on the information collected, estimating the mobile's location to a certain level of accuracy. In accordance with the illustrative embodiment of the present invention, xSMLC 207 performs location estimation via the Wireless Location Signature (WLS™) location method from Polaris Wireless, Inc. In some embodiments of the present invention, xSMLC 207 can use one or more other location methods that are well-known in the art. In addition, xSMLC 207 is capable of making location assistance data and location estimates obtained via the control plane available to hybrid location engine 217, via control plane (CP) database 219.

xSMLC 207 is based on a platform such as, but not limited to, SMLC 107. As those who are skilled in the art will appreciate after reading this disclosure, xSMLC 207 can alternatively be based on SAS (standalone SMLC) in accordance with the UMTS protocol, E-SMLC in accordance with the LTE protocol, or a different mobile location platform entirely.

Enhanced gateway mobile location center ("xGMLC") 209 performs standard functions that are analogous to the role of gateway mobile location center 109 in wireless network 100, with the enhancement that it can instruct one or more downstream xSMLCs, such as xSMLC 207, to perform their role in providing control plane location data in support of interrelating that data with user plane location data, in accordance with the illustrative embodiment of the present invention. As devised in the illustrative embodiment, enhanced gateway mobile location center 209 presents itself to other legacy elements of wireless network 200 with the identity of a legacy gateway mobile location center, thus enabling legacy signaling to occur logically to/from the other legacy elements.

Enhanced SUPL location platform ("xSLP") 211 provides functionality similar to that of xSMLC 207, except through the user plane (UP) instead of the control plane. The location estimation performed by xSLP 211 utilizes signal measurements and/or other data (e.g., handset-calculated location, etc.) that are obtained via the user plane from mobile station 150. In addition, xSLP 211 is capable of making location assistance data and location estimates obtained via the user plane available to hybrid location engine 217, via user plane (UP) database 221. xSLP 211 is based on a platform such as, but not limited to, SLP 111.

Hybrid UP CP anchor server 215 correlates the control plane and user plane location sessions, in accordance with the illustrative embodiment of the present invention. Anchor server 215 also acts as an interface with the application that requests the location of the mobile station, the application being part of LBS client 113. Server 115 also instructs xGMLC 209 and xSLP 211 to perform an enhanced user plane/control plane location estimation procedure, which results in UP and CP data being obtained. Server 215 also instructs hybrid location engine 217 to correlate the UP and CP data with each other, instead of performing a conventional control plane location procedure or a conventional user plane location procedure independently or alone. In performing all of this, hybrid UP CP anchor server 215 is said to be coordinating the acquisition of both control plane and user plane location data, thereby enabling the use of both types of data in a hybrid location estimation. Anchor server 215 is further described below and in FIG. 3.

Hybrid location engine 217 combines all available location assistance data and estimated locations to produce a hybrid location estimate.

Control plane (CP) database 219 stores the location assistance data and estimated locations obtained using the control plane location session.

User plane (UP) database 221 stores the location assistance data and estimated locations obtained using the user plane location session.

Two or more of the aforementioned elements communicate with each other via computer network 230, in well-known fashion. Computer network 230 can comprise one or more distinct networks that operate in accordance with one or more different protocols.

Each of the aforementioned data-processing systems (e.g., server computers, etc.) and databases are described as being physically distinct devices, in accordance with the illustrative embodiment of the present invention. As those who are skilled in the art will appreciate after reading this specification, however, two or more of the aforementioned elements can be implemented within single devices. For example and without limitation, the functionalities of xGMLC 209 and anchor server 215 can be implemented within the same server computer.

Additionally, the same equipment vendor can provide two or more of the aforementioned data-processing systems. For example and without limitation, the same vendor can provide xSMLC 207, xGMLC 209, and/or xSLP 211.

Figure 3:
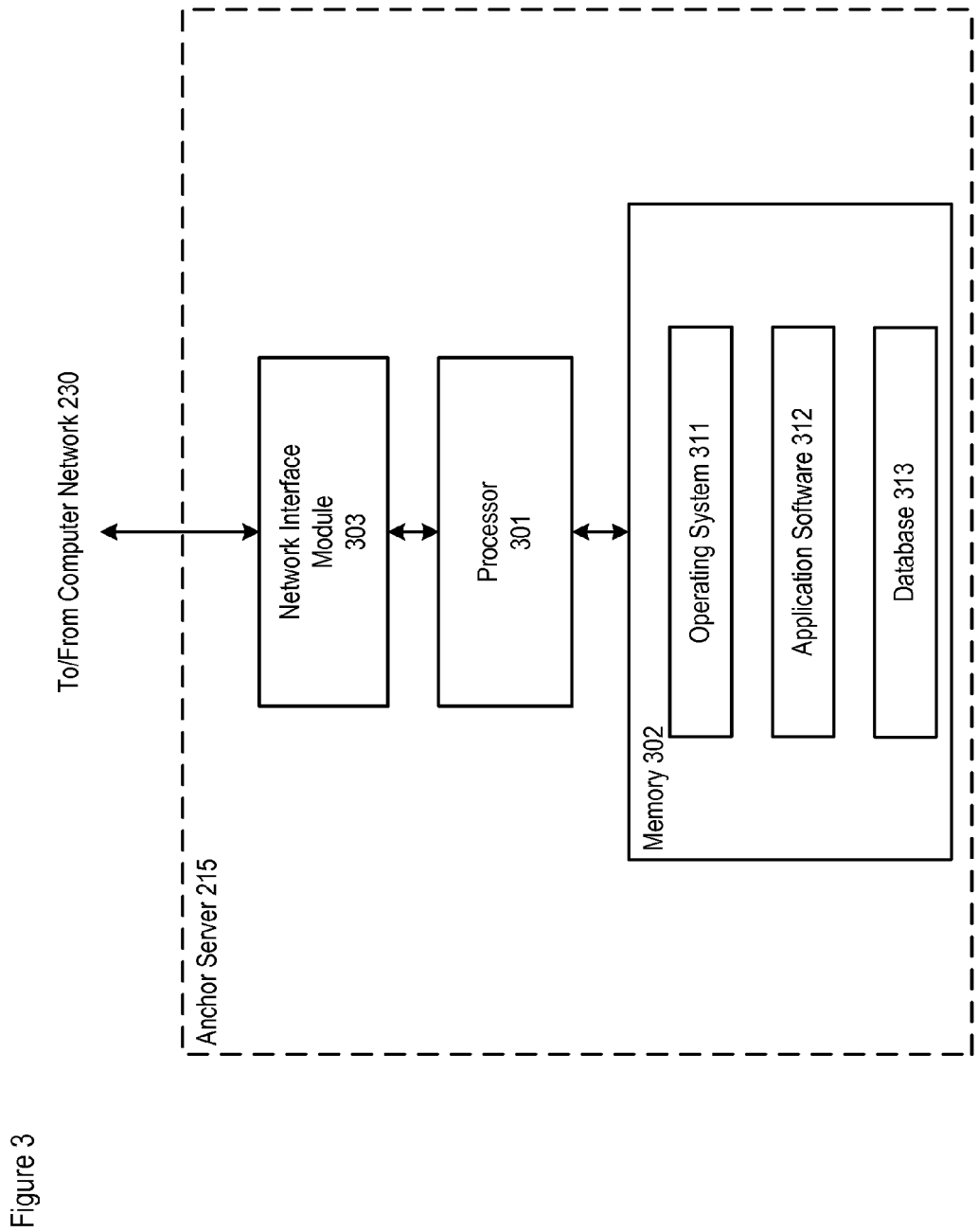
FIG. 3 depicts a block diagram comprising the salient elements of the data-processing hardware platform for hybrid UP CP anchor server 215 according to the illustrative embodiment.

FIG. 3 depicts a block diagram comprising the salient elements of the data-processing hardware platform for anchor server 215 according to the illustrative embodiment. Anchor server 215 is a data-processing system that comprises:

processor 301, memory 302, and network interface module 303. Anchor server 301 comprises the hardware and requisite software necessary to execute the specialized application software, receive signals, transmit signals, and process data such that it can perform the operations described herein.

Processor 301 is a general-purpose processor that is configured to execute operating system 311 and application software 312, and to populate, amend, use, and manage database 313, as described in detail below and in the accompanying figures. For the purposes of this specification, a "processor" is defined as one or more computational elements, whether co-located or not and whether networked together or not. Processor 301 is well known in the art.

Memory 302 is non-transitory and non-volatile computer storage memory technology that is well known in the art (e.g., flash memory, etc.). Memory 302 is configured to store operating system 311, application software 312, and database 313. The operating system is a collection of software that manages, in well-known fashion, server 215's hardware resources and provides common services for computer programs, such as those that constitute the application software. The application software that is executed by processor 301 enables server 215 to perform the functions disclosed herein. Database 313 comprises information relevant to each location request of each mobile station being location, wherein the location requests can arrive from one or more location-based services clients. Such information includes LBS client identification (ID), mobile station ID (e.g., MSISDN, etc.), accuracy required, time or delay, type of location estimation (e.g., CP-based, UP-based, hybrid, etc.), and correlation ID, for example and without limitation. Memory 302 is well known in the art.

Network interface module 303 is a component that enables anchor server 215 to communicate electronically with other components internal and external to wireless network 200. For example, module 303 enables communication pathways to/from LBS client 113, xGMLC 209, hybrid location engine 217, and other elements of wireless network 200. Network interface module 303 is well known in the art.

Figure 4A:
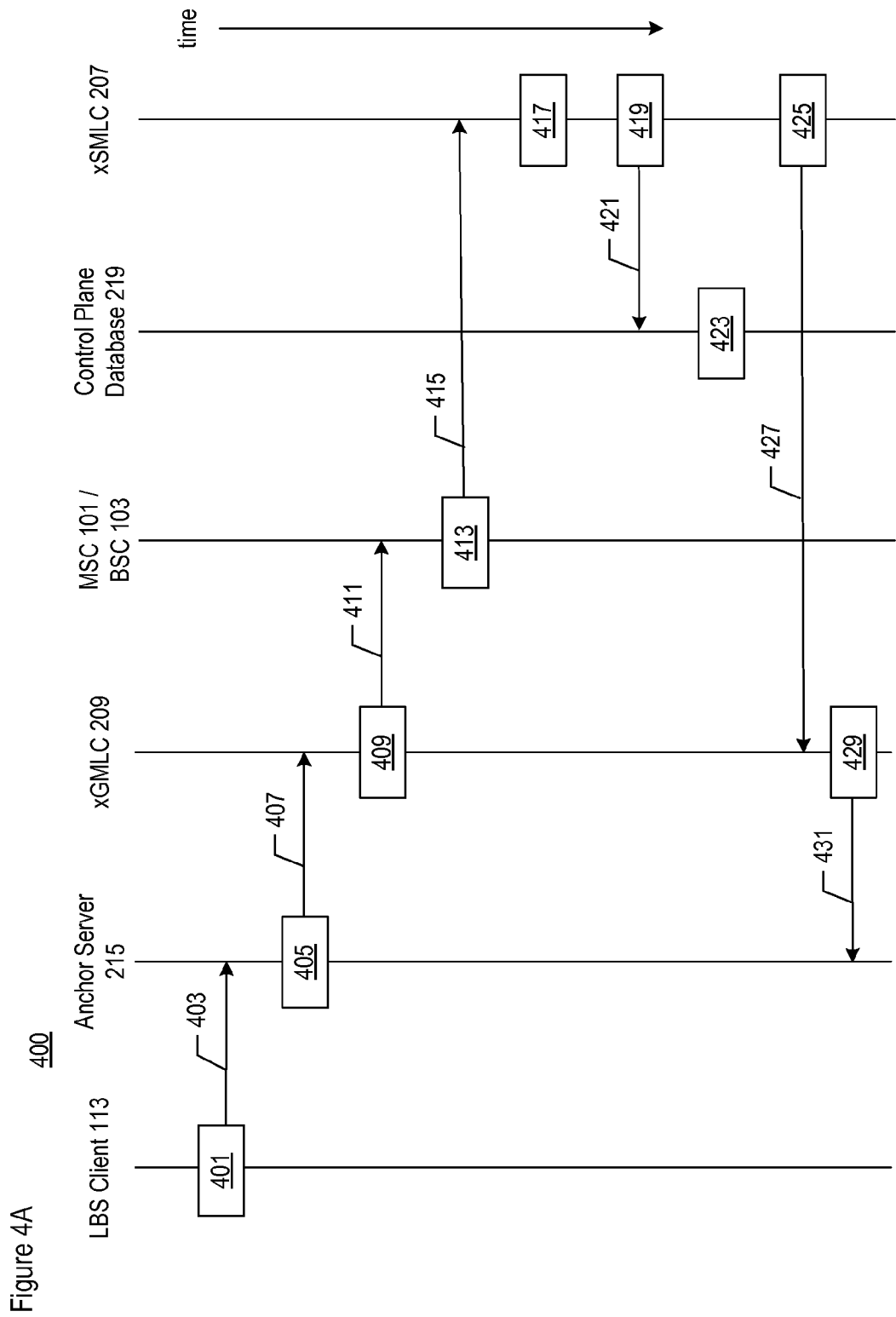
FIGS. 4A, 4B, and 4C depict some salient operations of method 400 according to an illustrative embodiment of the present invention, in which control plane and user plane location sessions are coordinated.
Figure 4B:
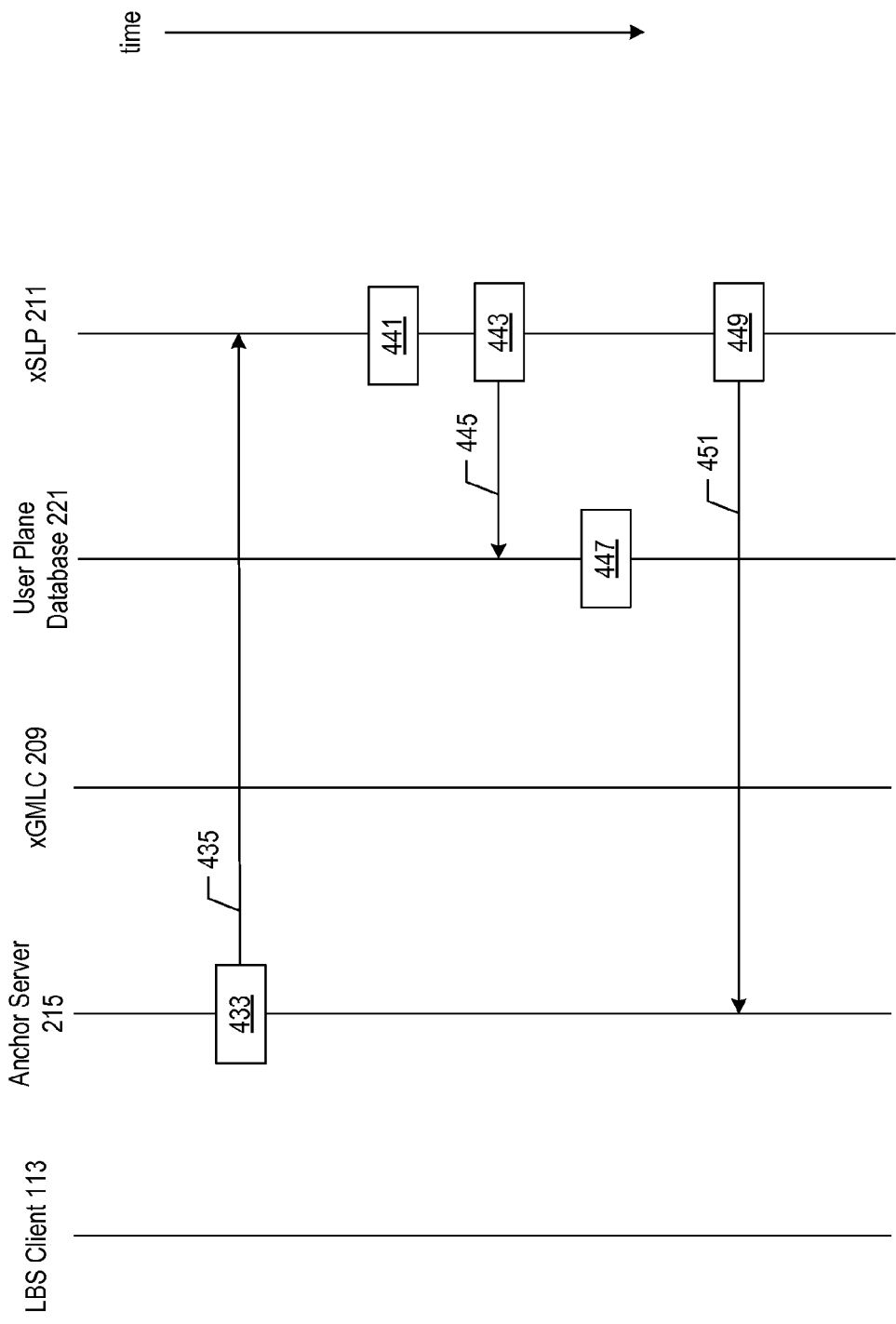
Figure 4C:
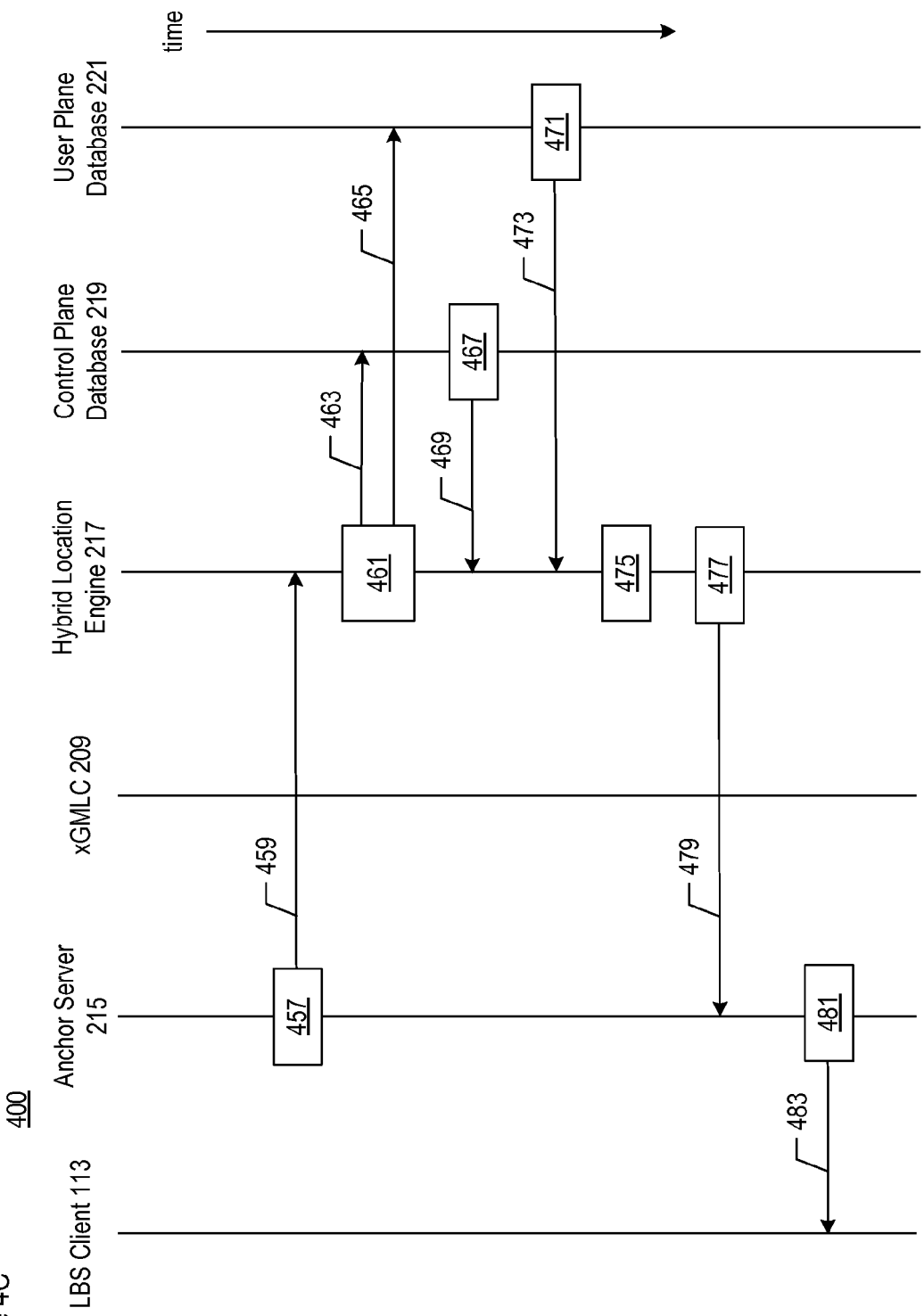

The specialized application software that is executed on the hardware platform by anchor server 215 enables the system to perform at least some of the operations in method 400, which is depicted in FIGS. 4A through 4C. It will be clear to those skilled in the art, after reading the present disclosure, that the data processing hardware platform of anchor server 215 can be embodied as a multi-processor platform, as a server computer, as a computer device, as a sub-component of a larger computing platform, or in some other computing environment—all within the scope of the present invention. It will be clear to those skilled in the art, after reading the present disclosure, how to make and use the data-processing hardware platform for anchor server 215.

In at least some embodiments of the present invention, the block diagram depicted in FIG. 3 comprises the salient elements of the data-processing hardware platform or platforms for xGMLC 209, xSLP 211, and/or hybrid location engine 217.

FIGS. 4A through 4C depict some salient operations of method 400 according to an illustrative embodiment of the present invention, in which control plane and user plane location sessions are coordinated. In regard to method 400, it will be clear to those skilled in the art, after reading the present disclosure, how to make and use alternative embodiments of the disclosed methods wherein the recited operations, sub-operations, and messages are differently sequenced, grouped, or sub-divided—all within the scope of the present invention. Also, it will be further clear to those skilled in the art, after reading the present disclosure, how to make and use alternative embodiments of the disclosed methods wherein at least some of the described operations, sub-operations, and messages are optional, are omitted, or are performed by other elements and/or systems.

At task 401, LBS client 113 generates a request for a location estimate and transmits the location request via message 403. The location request comprises an identification of the mobile station for which a location estimate is being requested. In some embodiments of the present invention, the identification comprises a mobile station international subscriber directory number (MSISDN). In some other embodiments of the present invention, a different identification can be included in the location request. In order to ensure proper routing of the message to anchor server 215, a technician can configure a destination address for message 403 that corresponds to the anchor server, in well-known fashion.

At task 405, anchor sever 215 receives the location request and starts a mobile terminated location request (MTLR) procedure by transmitting the location request via message 407 to xGMLC 209. This request comprises i) a flag that indicates that hybrid location estimation is required and ii) the mobile station identification (e.g., MSISDN, etc.) received in message 403. In accordance with the illustrative embodiment, the flag value is conveyed within the QoP bit-field, while in some other embodiments the flag value can be conveyed within a different bit-field.

As part of a standardized protocol, the QoP bit-field and also the QoS bit-field mentioned below comprise two information elements: i) accuracy required and ii) time or delay. The "accuracy required" element is used to specify the accuracy of the location estimate that is required by the requesting client. The "time or delay" element is used to specify how long the client can wait for a location estimate to be returned to it. A more accurate estimate generally needs more time. As those who are skilled in the art will appreciate after reading this specification, one or both of these elements can be used to represent the hybrid location flag. Furthermore, it will be clear to those skilled in the art, after reading this specification, how to select a particular numeric value to denote the particular type of hybrid location processing, or other type of location processing, to be invoked (e.g., "99" for hybrid, etc.) without interfering with already-standardized processes.

In some embodiments of the present invention, a particular flag value can be used to denote a particular action to be taken. For example and without limitation, various values can be used to denote i) hybrid location estimation, ii) only control-plane (CP) location, iii) only user-plane (UP) location, iv) CP location followed by UP location if CP location fails, v) UP location followed by CP location if UP locations fails, and so on. Server 215 can decide which action is to be taken based on one or more of i) the particular client that is requesting a location estimate, ii) the accuracy required, iii) how quickly the client needs the response, and so on, for example and without limitation, in which any or all of these parameters can be provided by LBS client 113 or provided from a different source.

Additionally, in some embodiments of the present invention, a particular flag value, or a value of a second type of flag, can be used to denote whether the xSMLC and/or the xSLP provides i) a location estimate, ii) a measurement report, or iii) both a location estimate and measurement report.

At task 409, xGMLC 209 transmits the location request via message 411 to MSC 101, which then transmits it to BSC 103. The location request is formatted and transmitted according to the standard protocol except that the QoS bit-field, instead of containing the conventional QoS values, now contains a flag value that indicates that this location request is in accordance with the hybrid procedure. In some other embodiments, this flag can be part of some other bit-field.

At task 413, BSC 103 transmits the location request via message 415 to xSMLC 207.

At task 417, xSMLC 207, upon detecting the hybrid flag in message 415 (i.e., in the QoS bit-field), does not perform the usual location request and instead performs the procedure directed by the hybrid flag. This includes collecting various types of measurement reports (MR) as measured by one or more base stations 105 and/or mobile station 150. It might include, either in the alternative or additionally, obtaining a location estimate (e.g., A-GPS from the handset, etc.). This collecting and obtaining is performed as per the standard protocol without involving any change in the existing wireless network or mobile station.

At task 419, once all of the MRs and/or location estimate are collected or determined, they are transmitted via message 421 to control plane database 219, based on the hybrid flag being set. The xSMLC 207 tags this data with a unique correlation identification for the control plane ("CP ID"). Database 219 stores the data, including the corresponding CP ID, at task 423 for future use.

At task 425, the same CP ID is also encoded in the latitude and longitude bit-fields of the response to the original location request, and is transmitted to xGMLC 209 via message 427, by way of BSC 103 and MSC 101. In the prior art, representations of latitude and longitude are used, at least in part, to define shapes such as a circle, a polygon, and so on. Such shapes are presented as one or more latitude/longitude sets and associated parameters that define the particular shape. For example, a circle is defined in terms of the latitude/longitude of its center and a radius (e.g., in meters, etc.) In accordance with the illustrative embodiment of the present invention, these representations are considered, when using the latitude/longitude bit-fields to represent the CP ID, in order to avoid confusion as to how the bit-fields are interpreted by a receiving data-processing system.

At task 429, xGMLC 209 forwards the response to anchor server 215 via message 431. Server 215 stores the information contained within message 431 for future use, including the CP ID.

At task 433, in response to having received message 403, anchor server 215 starts the user plane location session by transmitting the location request to xSLP 211 via message 435, concurrently with the MTLR procedure described above. This request comprises i) a flag that indicates that UP data is to be made available and ii) the mobile station identification (e.g., MSISDN, etc.) received in message 403. In accordance with the illustrative embodiment, the flag value is conveyed within the QoP bit-field, while in some other embodiments the flag value can be conveyed within a different bit-field. Task 433 and/or the subsequent tasks that are described below can be performed concurrently with the MTLR procedure described above or sequential to that procedure (i.e., before or after).

At task 441, xSLP 211, upon detecting the hybrid flag being set in message 435 (i.e., in the QoP bit-field), does not perform the usual location request and instead performs the enhanced procedure of the illustrative embodiment. This includes collecting various types of measurement reports (MR) as measured by mobile station 150. It might include, either in the alternative or additionally, obtaining the A-GPS-based location from the handset. This collecting and obtaining is performed as per the standard protocol without involving any change in the existing wireless network or mobile station.

At task 443, once all of the MRs and/or A-GPS location estimate are collected, they are transmitted via message 445 to user plane database 221, based on the hybrid flag being set. The xSLP 211 tags this data with a unique correlation identification for the user plane, which comprises the MSISDN in accordance with the illustrative embodiment. In some other embodiments of the present invention, the correlation identification can comprise a different identification. Database 221 stores the data at task 447 for future use.

Optionally, at task 449, this same ID (i.e., MSISDN) is also encoded in the latitude and longitude bit-fields of the response to the original location request, and is transmitted to anchor server 215 via message 451. Server 215 stores the information contained within message 451 for future use.

At task 457, in response having received both messages 431 and 451, anchor server 215 notifies hybrid location engine 217 to perform hybrid location estimation, by transmitting message 459 containing the correlation IDs for the control plane (i.e., CP ID) and for the user plane (i.e., MSISDN). In some alternative embodiments of the present invention, server 215 notifies engine 217 after having received at least one of messages 431 and 451.

At task 461, location engine 217 forwards the correlation IDs for the control plane and user plane received in message 459, to control plane database 219 via message 463 and to user plane database 221 via message 465, respectively.

At task 467, control plane database 219 accesses all of the data it had previously stored at task 425 that were tagged with the correlation ID for the control plane received in message 463, and transmits the data to location engine 217 via message 469.

At task 471, user plane database 221 accesses all of the data it had previously stored at task 447 that were tagged with the correlation ID for the user plane received in message 465, and transmits the data to location engine 217 via message 473.

At task 475, hybrid location engine 217 generates a location estimate of mobile station 150 based on both sets of data received in messages 469 and 473. For example and without limitation, engine 217 can i) estimate, based on the control plane location data, that the mobile station is at a first location, ii) estimate, based on the user plane location data, that the mobile station is at a second location, and iii) combine the first and second location estimates to conclude that the mobile station is at a particular location that is a hybrid of the first and second locations. Alternatively, engine 217 can combine the user plane location data and control plane location data to conclude that the mobile station is at a third location.

In some alternative embodiments of the present invention, engine 217 generates a location estimate of mobile station 150 in a manner consistent with the particular flag value described above and in task 405.

At task 477, location engine 477 transmits via message 479 the location estimate generated at task 475, to anchor server 215.

At task 481, anchor server 215 forwards the location estimate to LBS client 113 via message 483.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A location estimation system comprising:
   a first server computer that is configured to:
      i) receive a location request from a location-based services client, wherein the location request specifies a particular mobile station,
      ii) transmit, in response to receiving the location request, a first message comprising a first-message bit-field and a second message comprising a second-message bit-field, and
      iii) transmit a location estimate to the location-based services client, wherein the location estimate is based on both i) a first non-empty set of location data that is obtained through a control plane and ii) a second non-empty set of location data that is obtained through a user plane;
   a second server computer that is configured to:
      i) receive the first message, and
      ii) acquire, through the control plane, the first set of location data in response to receiving the first message and dependent on the value represented in the first-message bit-field;
   a third server computer that is configured to:
      i) receive the second message, and
      ii) acquire, through the user plane, the second set of location data in response to receiving the second message and dependent on the value represented in the second-message bit-field;
   a first database that is configured to receive and store the first set of location data, wherein the first set of location data comprises i) a first signal measurement that is obtained via the control plane and ii) a first identification (ID);
   a second database that is configured to receive and store the second set of location data, wherein the second set of location data comprises i) a second signal measurement that is obtained via the user plane and ii) a second identification (ID) that is based on the mobile station specified in the location request, and wherein at least the second ID comprises a mobile station international subscriber directory number (MSISDN) of the mobile station; and
   a location engine that is configured to:
      i) retrieve, using the first ID, the first set of location data from the first database,
      ii) retrieve, using the second ID, the second set of location data from the second database,
      iii) generate the location estimate, using the first and second sets of location data, and
      iv) transmit the location estimate to the first server computer;
   wherein at least the second message further comprises the MSISDN of the mobile station.

2. The system of claim 1 wherein the second server computer is further configured to provide serving mobile location center (SMLC) functionality, and wherein the third server computer is further configured to provide secure user plane location (SUPL) location platform (SLP) functionality.

3. The system of claim 1 wherein the first server computer is further configured to provide gateway mobile location center (GMLC) functionality.

4. The system of claim 1 wherein the first-message bit-field is a standardized bit-field that represents at least one of i) Quality of Positioning (QoP) and ii) Quality of Service (QoS).

5. The system of claim 1 wherein the first database is configured to receive at least part of the first set of location data via a third message, wherein the first ID is encoded, in the third message, in a bit-field that has been standardized to represent at least one of i) latitude and ii) longitude.

6. A method of location estimation comprising:
   receiving, by a first server computer, a location request from a location-based services client, wherein the location request specifies a particular mobile station;
   transmitting, by the first server computer and in response to receiving the location request, i) a first message comprising a first-message bit-field to a control plane server and ii) a second message comprising a second-message bit-field to a user plane server;

acquiring, by the control plane server and through a control plane, a first set of location data based on the first message and dependent on the value represented in the first-message bit-field;

acquiring, by the user plane server and through a user plane, a second set of location data based on the second message and dependent on the value represented in the second-message bit-field;

transmitting, by the first server computer, a location estimate to the location-based services client, wherein the location estimate is based on both i) the first non-empty set of location data that is obtained through the control plane and ii) the second non-empty set of location data that is obtained through the user plane;

receiving and storing, by a first database, the first set of location data, wherein the first set of location data comprises i) a first signal measurement that is obtained via the control plane and ii) a first identification (ID);

receiving and storing, by a second database, the second set of location data, wherein the second set of location data comprises i) a second signal measurement that is obtained via the user plane and ii) a second identification (ID) that is based on the mobile station specified in the location request, and wherein at least the second ID comprises a mobile station international subscriber directory number (MSISDN) of the mobile station;

retrieving, by a location engine and using the first ID, the first set of location data from the first database;

retrieving, by the location engine and using the second ID, the second set of location data from the second database;

generating, by the location engine, the location estimate using the first and second sets of location data; and transmitting, by the location engine, the location estimate to the first server computer;

wherein at least the second message further comprises the MSISDN of the mobile station.

7. The method of claim 6 wherein the control plane server provides serving mobile location center (SMLC) functionality, and wherein the user plane server provides secure user plane location (SUPL) location platform (SLP) functionality.

8. The method of claim 6 wherein the first server computer provides gateway mobile location center (GMLC) functionality.

9. The method of claim 6 wherein the first-message bit-field is a standardized bit-field that represents at least one of i) Quality of Positioning (QoP) and ii) Quality of Service (QoS).

10. The method of claim 6 wherein the first database receives at least part of the first set of location data via a third message, wherein the first ID is encoded, in the third message, in a bit-field that has been standardized to represent at least one of i) latitude and ii) longitude.

11. The method of claim 6 further comprising receiving an identification that identifies the location-based services client, wherein the transmitting of both the first and second messages is based on the value of the identification.

* * * * *